(12) United States Patent
Kato et al.

(10) Patent No.: US 7,564,487 B2
(45) Date of Patent: Jul. 21, 2009

(54) DIGITAL CAMERA AND CONTROL METHOD FOR GENERATING AN IMAGE FILE USING FEATURE EXTRACTION DATA

(75) Inventors: Masao Kato, Kanagawa (JP); Kentaro Yano, Kanagawa (JP); Akitoshi Yamada, Kanagawa (JP); Fumitaka Goto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 716 days.

(21) Appl. No.: 10/368,600

(22) Filed: Feb. 20, 2003

(65) Prior Publication Data

US 2003/0156196 A1 Aug. 21, 2003

(30) Foreign Application Priority Data

Feb. 21, 2002 (JP) ............................. 2002-044646

(51) Int. Cl.
*H04N 5/76* (2006.01)
(52) U.S. Cl. ............. 348/231.2; 348/231.3; 348/231.99
(58) Field of Classification Search ............. 348/207.2, 348/231.2, 231.3, 231.6, 231.9
See application file for complete search history.

(56) References Cited

U.S. PATENT DOCUMENTS

| | | | |
|---|---|---|---|
| 4,727,434 A | 2/1988 | Kawamura | 358/280 |
| 5,589,946 A | 12/1996 | Shimokoriyama et al. | 386/47 |
| 5,682,203 A | 10/1997 | Kato | 348/340 |
| 6,011,547 A * | 1/2000 | Shiota et al. | 382/254 |
| 6,201,571 B1 | 3/2001 | Ota | 348/239 |
| 6,273,535 B1 | 8/2001 | Inoue et al. | 347/3 |
| 6,346,937 B1 * | 2/2002 | Sasaki et al. | 345/211 |
| 6,452,601 B1 | 9/2002 | Marino et al. | 345/538 |
| 6,507,358 B1 | 1/2003 | Mori et al. | 348/42 |
| 6,628,830 B1 | 9/2003 | Yamazoe et al. | |
| 6,650,365 B1 * | 11/2003 | Sato | 348/231.3 |
| 2001/0007599 A1 | 7/2001 | Iguchi et al. | 382/274 |
| 2001/0013953 A1 | 8/2001 | Uekusa et al. | 358/444 |
| 2002/0027603 A1 * | 3/2002 | Kuwata et al. | 348/232 |
| 2002/0054224 A1 * | 5/2002 | Wasula et al. | 348/232 |

(Continued)

FOREIGN PATENT DOCUMENTS

EP 0 838 939 A2 4/1998

(Continued)

OTHER PUBLICATIONS

Official Letter/Search Report from Chinese Patent Office (date-stamped Apr. 2, 2004).

(Continued)

*Primary Examiner*—James M Hannett
*Assistant Examiner*—Kelly L Jerabek
(74) *Attorney, Agent, or Firm*—Fitzpatrick, Cella, Harper & Scinto

(57) ABSTRACT

A digital still camera is connected with a printer, a print-target image is selected from among the plural images stored in a memory card, feature data representing a histogram of the selected image and the like is extracted, and the feature data and the image are transferred to the printer in accordance with a print instruction. Then, the printer performs a correction process concerning brightness and color of the received image on the basis of the received feature data.

12 Claims, 7 Drawing Sheets

U.S. PATENT DOCUMENTS

2004/0201727 A1 * 10/2004 Ichikawa et al. ......... 348/223.1

FOREIGN PATENT DOCUMENTS

| EP | 0 902 589 A2 | 3/1999 |
| --- | --- | --- |
| EP | 0 938 227 A2 | 8/1999 |
| EP | 1 014 688 A2 | 6/2000 |
| JP | 60-199286 | 10/1985 |
| JP | 8-294025 | 11/1996 |
| JP | 10-191246 | 7/1998 |
| JP | 11-355627 | 12/1999 |
| JP | 2000-13625 | 1/2000 |
| JP | 2001-13953 | 1/2001 |
| JP | 2001-186365 | 7/2001 |
| WO | WO 00/72265 A1 | 11/2000 |
| WO | WO 00/74370 A1 | 12/2000 |

OTHER PUBLICATIONS

European Search Report (Ref. No. JAC/IM/2860130) dated Jun. 17, 2003.

European Office Action of European Application No. 03 251 240.0-1522, dated Sep. 26, 2007.

"Digital Still Camera Image File Format Standard (Exchangeable image file format for Digital Still Cameras: Exif) Version 2.1." Published by Japan Electronic Industry Development Association on Jun. 12, 1998, pp. 1-172. (XP-222 40 29).

"An Image Data File Fromat for Digital Still Camera." Published in IS& T's 48$^{th}$ Annual Conference Proceedings of 1995, pp. 421-424. (XP-061 87 75).

* cited by examiner

DIGITAL CAMERA AND CONTROL METHOD FOR GENERATING AN IMAGE FILE USING FEATURE EXTRACTION DATA

BACKGROUND OF THE INVENTION

1. Field of the Invention

The present invention relates to a digital still camera which analyzes a feature of an image.

2. Related Background Art

In case of intending to satisfactorily output an output image based on image data by a printer and a display, it is necessary for each of plural objects constituting the output image to perform color processes such as a color correction process, a color conversion process, a binarization process and the like according to a kind of object. Generally, in case of printing or displaying an image formed based on a computer application, a device driver or a device performs rasterizing of a drawing command group issued based on the computer application to generate bitmap image data for a whole page, thereby performing the printing or the displaying based on the generated bitmap image data.

In recent years, according to a system or an application, a source profile is designated in regard to each of the objects constituting the image, whereby the device driver can obtain a higher-quality output by using the contents of the designated source profile. For example, in a case where a scanner-input image is affixed to an electronic document, a color profile which describes a device characteristic of the scanner is designated in a drawing instruction for the scanner input image. Further, in a case where color calibration or the like is performed on the display, a color profile which describes characteristics of a monitor used by an editor to edit the original image is designated to faithfully reproduce the color viewed by the editor. Incidentally, the above color profile may be, e.g., an ICC (International Color Consortium) profile. Besides, ICM™ of Windows™ available by Microsoft, ColorSync™ available by Apple Computer, and the like are known as systems which can use the above profile.

In addition to such a delicate color matching processing system, in a photographic image, even if the quality of an original image itself is inferior, there are some techniques to obtain a beautiful and high-quality output from the inferior original image. For example, if exposure of an image shot by a digital still camera which has been recently in widespread use is inappropriate, a user has to perform an image correction process such as a nonlinear color balance process or the like by using an image retouch application to improve the inappropriately exposed image. However, in such a case, if a user not having high knowledge and experience tries to perform the setting for the appropriate correction process, he has to repeat it by trial and error, whereby it takes an excessive time.

Thus, there is a technique to automatize such an image correction by using the method disclosed in Japanese Patent Application Laid-Open No. 2000-13625 or the like, and the technique is applied also to an image recording apparatus. In Japanese Patent Application Laid-Open No. 2000-13625, a histogram concerning brightness is created based on pixel data of an original image, the pixel data accumulated from a predetermined pixel value and corresponding to a predetermined frequency is detected, highlight and shadow points are obtained based on the detected pixel data, and an image correction process to correct color fogging of the entire image is performed based on the obtained highlight and shadow points, thereby achieving a high-quality image with a low processing load.

On one hand, according to popularization of a digital still camera, a demand for image output from a so-called photo-direct (PD) printer or the like is increasing. Here, it should be noted that, in the printing of the image by using the PD printer, the data of the digital still camera is first stored in a recording medium such as a CompactFlash™ card (simply called a CF card hereinafter) or the like, the CF card is then inserted into a card slot provided on the body of the printer, the data stored in the CF card is thus read and printed directly by the printer without any host computer. Moreover, a PD printer system is being popularized. Here, it should be noted that, in the printing of the image by using the PD printer system, the data of the digital still camera is directly transferred to the PD printer via an interface such as a USB (universal serial bus) or the like (i.e., not using any recording medium), the received data is then converted into data for data recording on the printer side, and the data recording is actually performed by the printer on the basis of the converted data.

The above PD printer includes an image processing function called a controller unit. Thus, various processes such as image rendering, rasterizing, color conversion, quantization, print control command generation and the like which are ordinarily performed on the host computer side are all performed on the controller unit side, and the processed data is then transferred from the controller unit to an engine unit. Then, the engine unit analyzes a print control command and print data in the transferred data, and thus performs mechanical control such as paper feeding control, carriage movement control and the like necessary to record the image on a recording paper. Moreover, the engine unit performs control to apply a driving pulse to a recording head, control to transmit the data to the recording head, and the like. Here, it should be noted that the above control in the engine unit is the same as the control to be performed in a conventional case where the data from a host PC is received by the engine unit.

Moreover, in recent years, a technique has been adopted such that printer control information for a specific printer is filed in advance on the digital still camera side together with image data, the information is then transferred and obtained on the specific printer side, and the obtained information is corrected on the printer side when the image data is actually recorded. Here, it should be noted that the printer control information for the specific printer concerns designation of print parameters (an amount of correction in regard to a print density, etc.), print control, and the like.

However, in a case where the above technique for appropriately correcting the image transferred from the digital camera or the like is achieved in the PD printer, such problems as follows are recognized.

That is, in a case where an image stored in a recording medium such as the CF card or the like is corrected and then printed, the number of accesses to the CF card increases, and print speed substantially decreases.

More specifically, a user accesses the CF card to read the stored data file for an ordinary print data generation process. In addition, the user has to access the CF card once in advance to read and analyze the image file in order to create a histogram necessary for the image correction. Although it is possible to perform both the advance access for the image correction and the access for the ordinary color process in a lump, a large-capacity memory capable of expanding and holding all the read image data in this case is necessary in the body of the PD printer, whereby the cost greatly increases. Moreover, as the number of recording pixels increases every year due to development in the image quality of the digital still camera, the cost increase in regard to the memory becomes large.

Incidentally, an image shot by the digital still camera is generally stored often in the form of a compressed file according to a JPEG (Joint Photographic Experts Group) standard or the like (hereinafter such a compressed image is simply called a JPEG image). In this case, since the content of the JPEG image itself cannot be seen until the data is decompressed, decompression of the JPEG image data as well as the file access is necessary to create the histogram. Thus, a data processing amount further increases, whereby print speed decreases.

Moreover, in a case of laying out and recording plural images on one recording paper, since the number of image files to be analyzed further increases, the number of times the file is accessed and the JPEG image data is decompressed also increases. Thus, the process load further increases as the number of files increases, whereby print speed decreases.

Moreover, in a case where image data previously stored in the storage medium of the digital still camera is then read directly from the body of the PD printer and then printed, as well as the above case of reading the data from the recording medium, the number of times a file is accessed and the number of times JPEG image data is decompressed increases, whereby the process load increases. Thus, print speed decreases.

Moreover, in the above technique when the printer control information concerning the designation of print parameters (the amount of correction in regard to the print density, etc.), the print control, and the like are filed in advance on the digital still camera side together with the image data, it is impossible to avoid that this information is provided in consideration of the specific characteristics of the recording device which should perform the printing. Thus, when an unexpected recording device is used, the above information becomes meaningless, and thus it is inappropriate for general use.

SUMMARY OF THE INVENTION

An object of the present invention is to provide a digital still camera which eliminates such inconveniences as above, a control method which is applied to the digital still camera, and a print system which includes the digital still camera.

Another object of the present invention is to provide a digital still camera from which an original image is transferred to the body of a PD printer to be image-corrected, thereby achieving a high-quality image and providing a satisfactory print environment by suppressing an increase of excessive processing loads. The present invention includes a control method which is applied to the digital still camera, and a print system which includes the digital still camera.

Still another object of the present invention is to provide a digital still camera from which image analysis data such as a histogram or the like analyzed in the camera itself can be transferred to a printer, a control method which is applied to the digital still camera, and a print system which includes the digital still camera.

Other objects of the present invention will be apparent from the following description taken in conjunction with the accompanying drawings, and the appended claims.

DETAILED DESCRIPTION OF THE PREFERRED EMBODIMENTS

Hereinafter, the embodiments of the present invention will be explained with reference to the attached drawings.

First Embodiment

Hereinafter, the first embodiment of the present invention will be explained. First, a PD printer to which the present invention is applicable will be explained with reference to FIGS. 1 to 6A and 6B.

Figure 1:
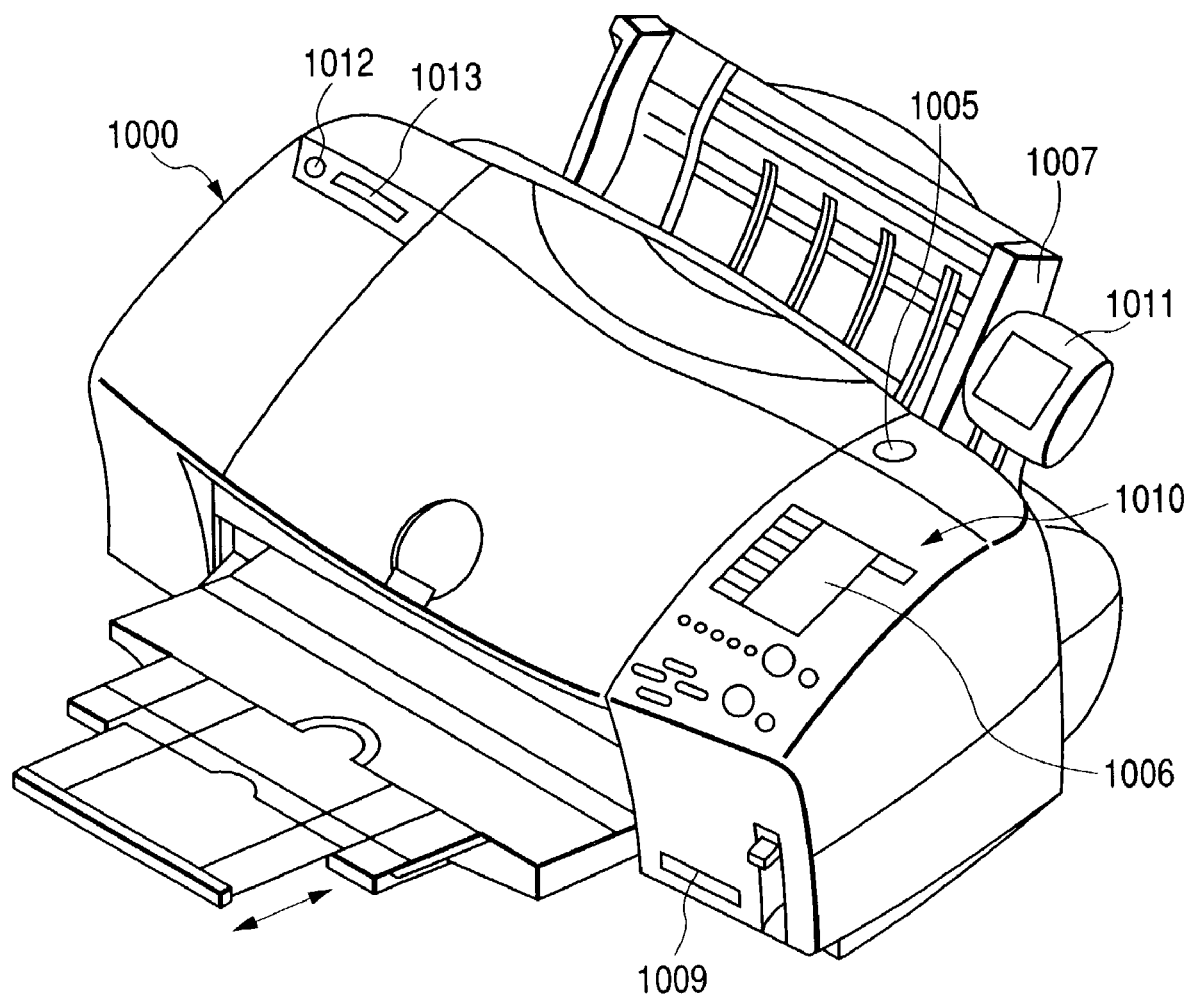
FIG. 1 is a perspective view showing an external appearance of a PD printer.

FIG. 1 is a perspective view showing an external appearance of a PD printer 1000 according to the present embodiment. The PD printer 1000 includes a function as an ordinary PC (personal computer) printer to receive data from a host computer (PC) and print the received data, and a function to directly read image data stored in a storage medium such as a memory card or the like and print the read image data or to receive image data from a digital still camera and print the received image data.

In FIG. 1, a depressible power supply key 1005 is provided on the top surface of the PD printer 1000. Moreover, an operation panel 1010 which includes a liquid crystal display unit 1006, various key switches and the like is provided on the right of the upper case, and the structure of the operation panel 1010 will be explained in detail with reference to FIG. 2. In FIG. 1, numeral 1007 denotes an automatic paper feeding unit which automatically feeds a recording paper (also called a recording sheet) into the body of the PD printer 1000. Numeral 1009 denotes a card slot into which an adapter (PCMIA (Personal Computer Memory Card International Association) card adapter) capable of being equipped with the memory card is inserted, whereby the image data stored on the memory card can be directly read and printed through the adapter. Here, for example, a compact flash memory, a smart media, a memory stick and the like can be used as the memory card. Numeral 1011 denotes a viewer which is structured by a liquid crystal display unit and is detachable from the body of the PD printer 1000. For example, when an image intended to be printed is retrieved or searched from among plural images stored in the memory card, the viewer 1011 is used to display the image of each frame, an index image and the like. Numeral 1012 denotes a terminal which is used to connect a later-described digital still camera, and numeral 1013 denotes a USB connector which is used to connect the PC.

Figure 2:
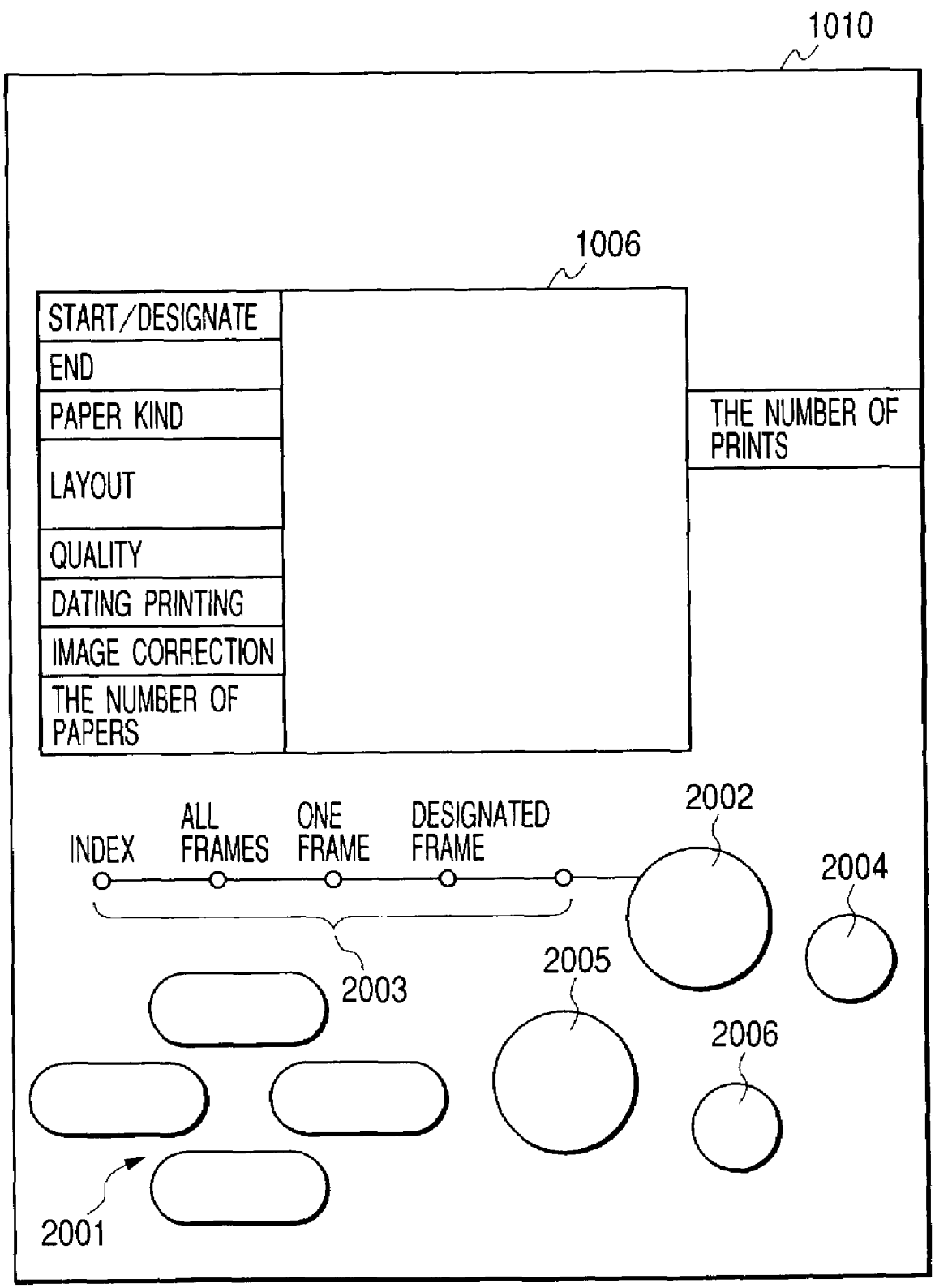
FIG. 2 is a diagram showing an operation panel of the PD printer.

FIG. 2 is a diagram showing an external appearance of the operation panel 1010 according to the present embodiment. In FIG. 2, the liquid crystal display unit 1006 displays menu items which are used to set various data concerning the items described on the right and left of this unit. Here, the items to be displayed include a headmost image number within a range intended to be printed and selected from the plural images in the memory card and a designated frame number (START/DESIGNATE), a last image number within a range intended to be print-ended (END), the number of prints (THE NUMBER OF PRINTS), a kind of recording paper (recording sheet) to be used for the printing (PAPER KIND), setting of the number of images to be printed on one recording paper (LAYOUT), designation of print quality (QUALITY), designation as to whether or not the shoot date is to be printed (DATING PRINTING), designation as to whether or not an image is to be printed after correction (IMAGE CORRECTION), display of the number of papers necessary for the printing (THE NUMBER OF PAPERS), and the like, and these items are selected or designated by using cursor keys 2001. Numeral 2002 denotes a mode key. The kind of printings (i.e., index printing, all-frame printing, one-frame printing, etc.) can be changed every time the mode key 2002 is depressed, and a corresponding LED in a LED group 2003 is lit according to the depression. Numeral 2004 denotes a maintenance key which is used to perform maintenance of the PD printer such as cleaning of a recording head or the like, numeral 2005 denotes a print start key which is depressed to instruct print start or establish maintenance setting, and numeral 2006 denotes a print stop key which is depressed to stop the printing or instruct a stop of the maintenance.

Then, the structure of the main portion concerning the control of the PD printer 1000 will be explained with reference to FIG. 3. It is assumed that, in FIG. 3, the components which are common to those in FIGS. 1 and 2 are respectively shown with the numerals same as those in these drawings, and the explanation of these components will be omitted.

Figure 3:
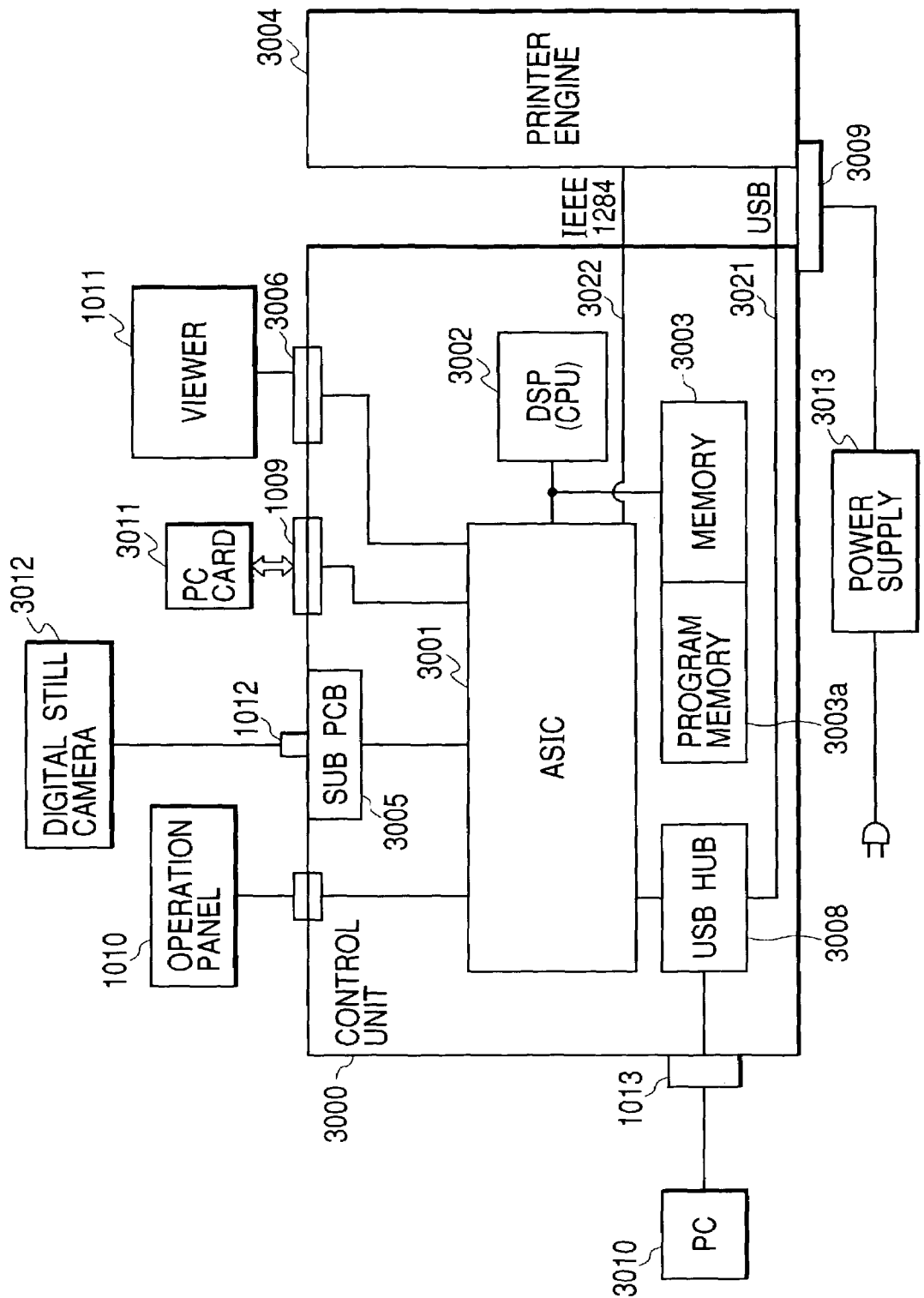
FIG. 3 is a block diagram showing the structure of the PD printer and devices connected thereto.

In FIG. 3, numeral 3000 denotes a control unit (control substrate), and numeral 3001 denotes an ASIC (application specific IC) which acts as a dedicated custom LSI and of which the structure will be later described in detail with reference to FIG. 4. Numeral 3002 denotes a DSP (digital signal processor) such as DSP-C6211™ available from Texas Instruments which includes a CPU to perform various control processes, and various image processes such as conversion of a brightness signal (R, G and B signals) into a density signal (C, M, Y and K signals), scaling, gamma conversion, error diffusion and the like. Numeral 3003 denotes a memory which includes a program memory 3003a for storing control programs of the CPU of the DSP 3002, a RAM area for storing execution programs, and a memory area for functioning as a working memory to store image data and the like. Numeral 3004 denotes a printer engine. In the present embodiment, the printer engine 3004 for an ink-jet printer which prints a color image by using plural kinds of color inks is provided. Numeral 3005 denotes a USB bus connector which functions as the port to connect a digital still camera 3012, and numeral 3006 denotes a connector which connects the viewer 1011. Numeral 3008 denotes a USB hub which gets, in a case where the PD printer 1000 prints image data transferred from a general PC 3010, the transferred image data through the hub itself as it is and then outputs the image data to the printer engine 3004 through a USB 3021. Thus, the connected PC 3010 can perform the printing by directly exchanging data and signals with the printer engine 3004 (that is, such a system functions as a general PC printer). Numeral 3009 denotes a power supply connector to which a DC voltage converted from a commercial AC voltage is input from a power supply 3013, numeral 3011 denotes a memory card (PC card), and numeral 3012 denotes the digital still camera.

Here, it should be noted that the signal is exchanged between the control unit 3000 and the printer engine 3004 through the USB 3021 or an IEEE (Institute of Electrical and Electronics Engineers) 1284 bus 3022.

Figure 4:
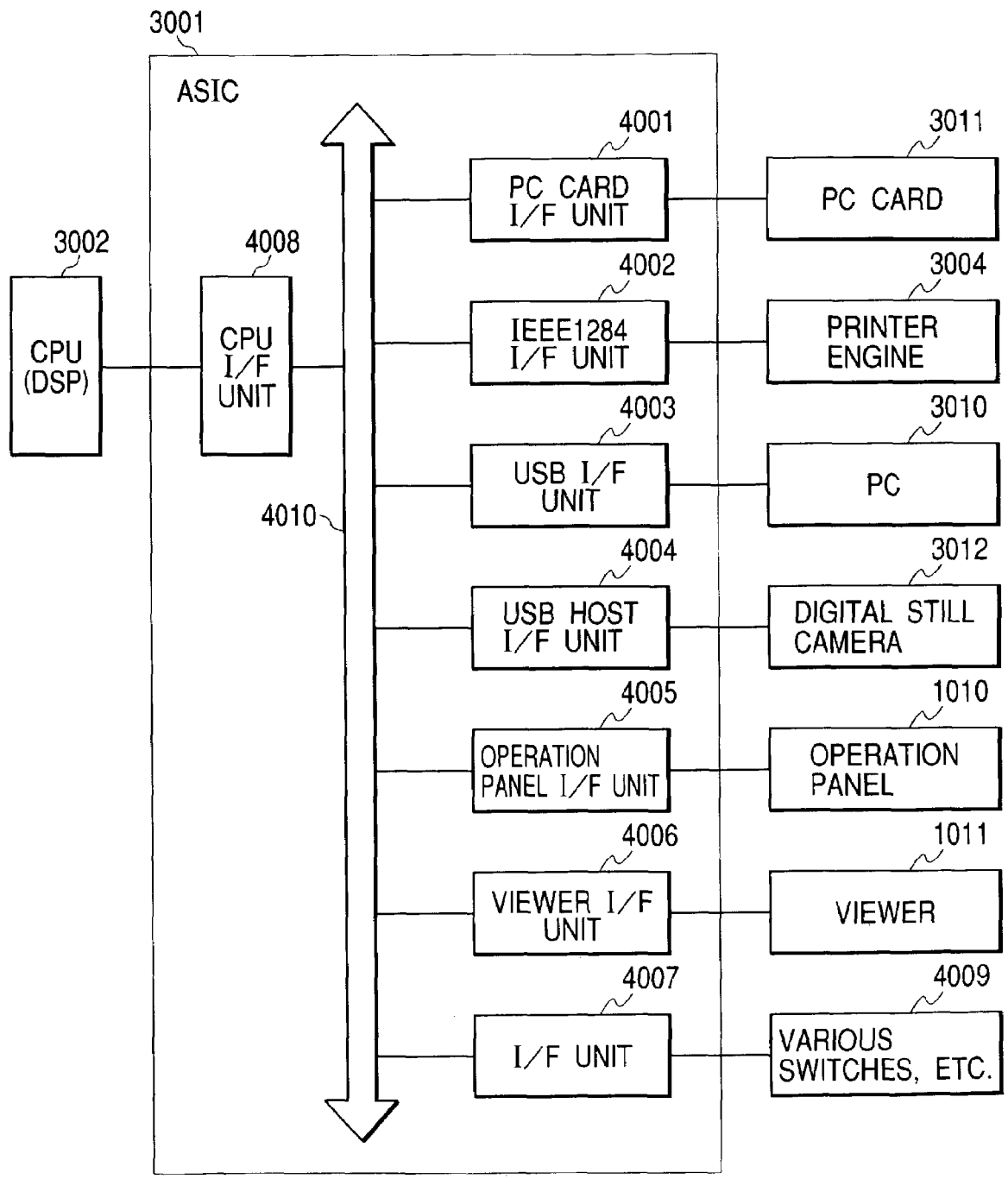
FIG. 4 is a block diagram showing an interface structure of the PD printer.

FIG. 4 is the block diagram showing the structure of the ASIC 3001 shown in FIG. 3. It is assumed that, in FIG. 4, the components which are common to those in FIGS. 1 to 3 are respectively shown with the numerals same as those in these drawings, and the explanation of these components will be omitted.

In FIG. 4, numeral 4001 denotes a PC card interface (I/F) unit which reads the image data stored in the equipped PC card 3011, and writes data in the PC card 3011. Numeral 4002 denotes an IEEE 1284 I/F unit which exchanges data with the printer engine 3004 and is used in case of printing the image data stored in a recording medium of the digital still camera 3012 or the PC card 3011, numeral 4003 denotes a USB I/F unit which exchanges data with the PC 3010, numeral 4004 denotes a USB host I/F unit which exchanges data with the digital still camera 3012, numeral 4005 denotes an operation panel I/F unit which inputs various operation signals from the operation panel 1010 and outputs display data to the liquid crystal display unit 1006, numeral 4006 denotes a viewer I/F unit which controls the display of image data on the viewer 1011, and numeral 4007 denotes an I/F unit which controls the interface with various switches and LED's denoted by numeral 4009. Numeral 4008 denotes a CPU I/F unit which controls the exchange of data with the DSP 3002, and numeral 4010 denotes an internal bus (ASIC bus) which connects the above units with others.

Figure 5:
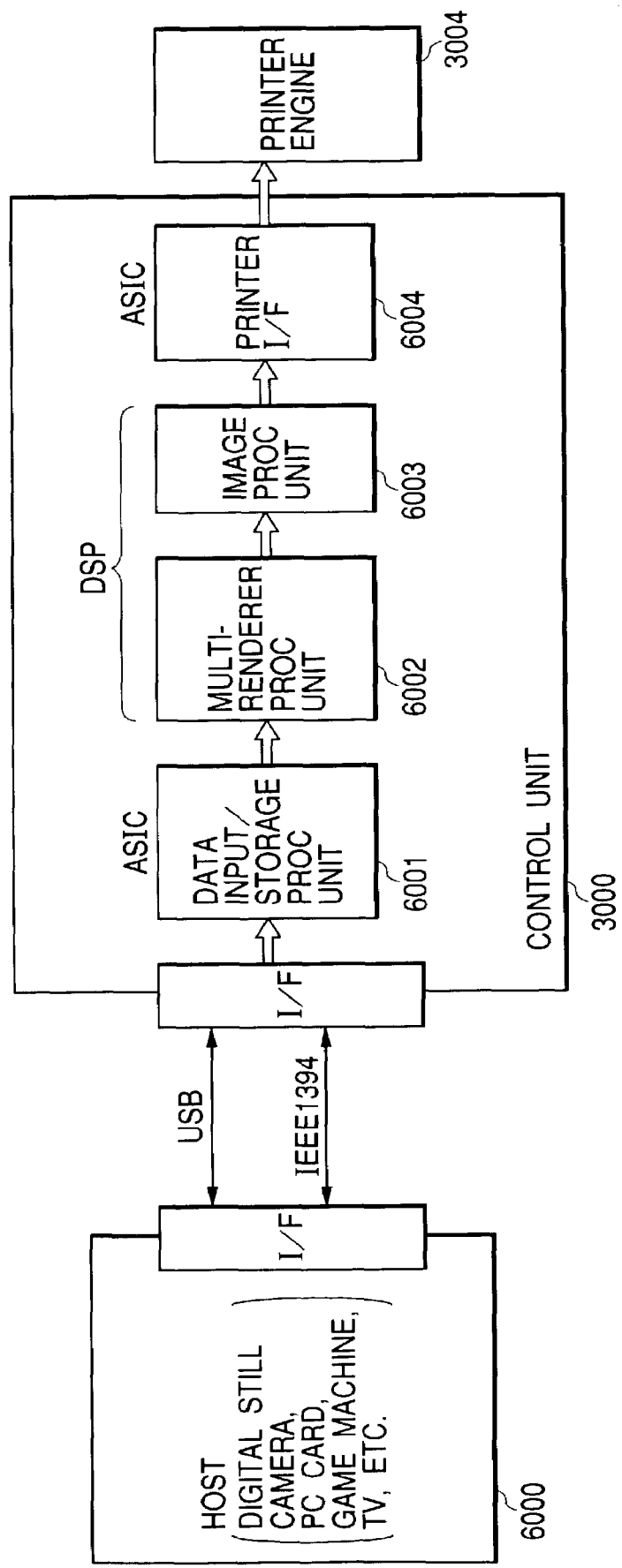
FIG. 5 is a functional block diagram showing a functional structure concerning image processing control of the PD printer.
Figure 6:
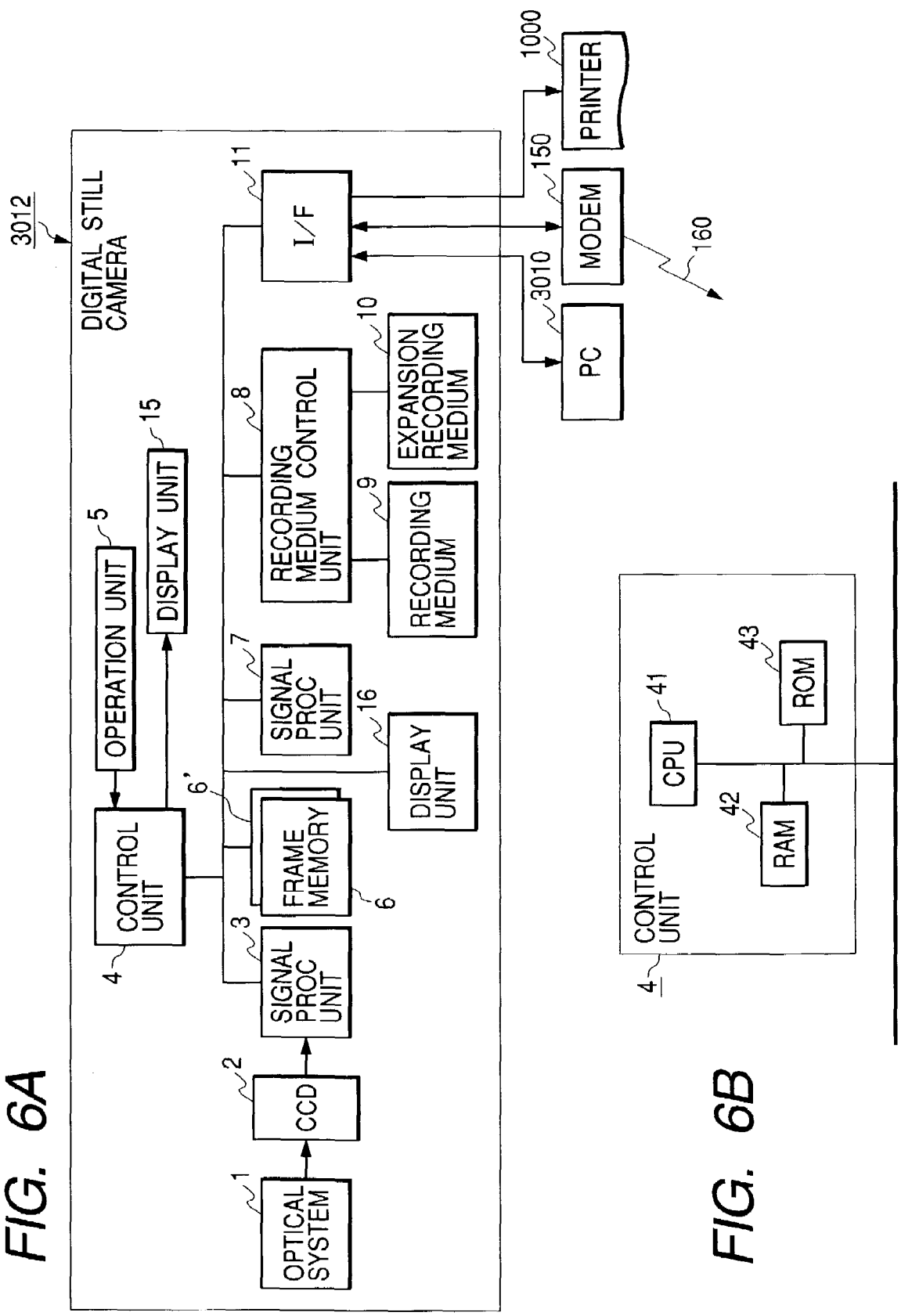
FIGS. 6A and 6B are block diagrams showing a structure of a digital still camera.

FIG. 5 is a functional block diagram showing the functional structure concerning the interface and the image processing control of the PD printer 1000 according to the present embodiment. It is also assumed that, in FIG. 5, the components which are common to those in FIGS. 1 to 4 are respectively shown with the numerals same as those in these drawings, and the explanation of these components will be omitted.

In FIG. 5, numeral 6000 denotes a host (image data source) for the PD printer 1000. Here, it should be noted that the host 6000 includes the above PC 3010 acting as the host computer, the digital still camera 3012, the PC card (memory card) 3011, a not-shown game machine, a not-shown television and the like. The host 6000 is connected to the control unit 3000 through a wired interface such as a USB, an IEEE 1284 bus, an IEEE 1394 bus or the like, or may be connected else through a wireless interface such as Bluetooth™ or the like.

Besides, the control unit (control substrate) 3000 includes a data input/storage processing unit 6001 which is used by the ASIC 3001, a printer I/F 6004 which outputs print data to the printer engine 3004, and a MuliRenderer processing unit 6002 and an image processing unit 6003 which are used by the DSP 3002.

First, the image data is read from the host 6000 by the control unit 3000 through the I/F, and the read data is stored in the data input/storage processing unit 6001. The stored data is subjected to a MultiRenderer process by the DSP 3002 and thus restored to bitmap data, and the restored bitmap data is converted into data that can be processed by the processing unit 6003. Here, the processing unit 6003 performs processes which are the same as the size conversion, color conversion and quantization processes performed by a printer driver of an ordinary host PC. Incidentally, the color process in this case includes, e.g., an image correction process to appropriately represent colors of the image shot by the digital still camera, in addition to general color conversion processes such as a conversion process to convert R, G and B signals into R', G' and B' signals for correcting a difference between a former-image color space and a printer output color space, a color conversion process to convert the R', G' and B' signals into C, M, Y and K signals for the components of coloring materials to be used in the printer, an output gamma correction process and the like. After then, the print data is transferred to the printer engine 3004 through the printer I/F 6004. Although the detailed operation in the printer engine 3004 is not explained specifically, various controls such as motor control in the printer, data transfer to the recording head, and the like are performed in known manners to record the image on the recording paper.

In the process of the PD printer to which the present invention is applied, it is characteristic that the process is performed by using the DSP. In general, the DSP specializes in calculating the sum of products, and more particularly, the high-function DSP which contains the considerable operation elements as in the present embodiment can advantageously perform the parallel operations such as the plural calculations of the sum of products. In particular, the DSP in the present embodiment is suitable for the operations such as a color process, a quantization process and the like which generally impose a burden on an ordinary processor in case of performing the direct printing.

In the controller of the PD printer according to the present embodiment, a main process is performed in the form of software process by using the DSP. Here, the present invention is applicable to a controller in which a part of the process is performed in the form of software process and a remaining process is performed in the form of hardware process. However, if the hardware process becomes heavy, expandability and flexibility such as addition of a high-speed function becomes poor as compared with the software process. On the other hand, by using the high-function DSP as in the present embodiment, it is possible to achieve a system which is excellent in the high-speed operation, the expandability and the flexibility.

Particularly, in the process of problem recognition until the present invention is made, if the high-function DSP as above is used, other processes such as the image process and the like are performed relatively at high speed. Thus, in this case, it has been known that the process which becomes a high ratio in the processing time is the time to access the storage medium such as the PC card or the like. For this reason, if the high-function DSP as in the present embodiment is applied to the PD printer, it is recognized that the performance of the printer can be further improved.

Next, the digital still camera to which the present invention is applicable will be explained with reference to FIGS. 6A and 6B. FIG. 6A is the block diagram showing the internal structure of the digital still camera 3012. Here, it should be noted that another digital camera which has a more complicated structure as compared with the structure shown in FIG. 6A may be used.

In the digital still camera 3012 shown in FIG. 6A, numeral 1 denotes an optical system which consists of a lens, a diaphragm mechanism and the like and through which incident light reflected from a shot target image enters. Numeral 2 denotes a CCD which converts the shot light from the optical system 1 into an electrical signal, and numeral 3 denotes a signal processing unit which processes the signal sent from the CCD 2 and then outputs the processed signal as multivalued (R, G, B) raster data (image data) to a frame memory 6. Numeral 4 denotes a control unit which controls the operations of the signal processing unit 3, the frame memories 6 and 6', a signal processing unit 7 and a recording medium control unit 8. Control unit 4 also controls various processes such as an image process, an image compression/decompression process and the like, and an image feature extraction process such as histogram creation, which is a characteristic of the present invention. Numeral 5 denotes an operation unit which inputs user's instructions based on user's switching operations and the like, converts the input instruction into a digital signal, and then transfers the digital signal to the control unit 4. Numeral 7 denotes the signal processing unit which performs a conversion process of the R, G and B raster data on the frame memory into a brightness component Y and color difference components Cr and Cb, a JPEG compression process to these components, an image reduction process to create thumbnail images, the image feature extraction process such as the histogram creation, and the like. Numeral 8 denotes the recording medium control unit which performs a process to write the image data that was JPEG-compressed by the signal processing unit 7 (hereinafter called JPEG image data), thumbnail image data, image feature extraction data such as histogram information, and the like on a predetermined area of a recording medium 9 or an expansion recording medium 10, and controls reading of the recorded JPEG image data. Numeral 9 denotes the recording medium on which the image data and the image feature extraction data are stored, numeral 11 denotes an I/F (or USB I/F) which is used to exchange the data between the expansion recording medium 10 and an external apparatus, numeral 15 denotes a display unit which consists of an LED lamp and the like to display switching states and function specifications, and numeral 16 denotes a display unit which consists of a liquid crystal display and the like to display shot images, images being shot, an operation menu and various information. Here, it should be noted that the JPEG image data, the thumbnail image data and the image feature extraction data may be stored as one file or otherwise as independent files on the recording medium 9 or the expansion recording medium 10. In this case, if the data are stored as the independent files, it is necessary to associate the files of the former image data and the image feature extraction data with others and then store the associated files.

On the frame memory 6 which is ordinarily used as the image display memory of the display unit 16, the image data is expanded in the form of bitmap image. On one hand, the frame memory 6' is used as the menu display memory of the display unit 16. When the data are displayed on the display unit 16, the contents of the frame memories 6 and 6' overlap each other.

The recording medium 9 consists of a flash memory which is fixed inside the digital still camera 3012. Here, it should be noted that the recording medium 9 may be structured to record a program or the like in addition to the image data. Besides, although CompactFlash™ (CF) is used as the expansion recording medium 10, another kind of memory may be used.

A USB interface is used as the I/F 11, and the I/F 11 is used to receive the programs sent from the computers such as the PC 3010 and the like, transmit the image data to the PC 3010, send the image data to a communication line 160 or the like through a modem 150, and transmit the print image data to the PD printer 1000 and a facsimile machine.

FIG. 6B shows the structure of the control unit 4 which consists of a CPU 41, a RAM 42 and a ROM 43. In the ROM 43, a control means composed of a group of programs necessary for the operation control of the digital still camera 3012, and the data processes in the digital still camera 3012 such as the color process, the data compression process and the like has been stored.

Moreover, print data generation programs which include a printer driver and the like may be stored in the ROM 43. Alternatively, the print data generation programs may be previously captured from an external recording medium such as a magnetic disk, a CD-ROM, a memory card or the like and stored in the recording medium 9 or the expansion recording medium 10 so that these programs can be read and executed at any time.

The above is the broad explanation of the PD printer and the digital still camera to which the present invention is applicable.

Next, the image feature extraction data for the image correction will be described. To perform the image correction, such a known method as disclosed in U.S. Pat. No. 4,727,434 (corresponding to Japanese Patent Application Laid-Open No. 60-199286), Japanese Patent Application Laid-Open No. 2000-13625, U.S. Patent Application Publication No. 2001013953 (corresponding to Japanese Patent Application Laid-Open No. 2001-186365) or the like may be used. In case of executing the above image correction method, it is necessary to calculate the data (image feature extraction data) which is extracted from the features of the former image and suitable for this method. The features of the former image includes (1) the histogram concerning the brightness, (2) the average color difference amount of the pixels having the same brightness value, (3) the histogram concerning the hue, (4) the histogram concerning the color saturation (or chroma), (5) the histogram concerning the density, (6) the highlight-point brightness, (7) the dark-point brightness, (8) the average color difference at the highlight points, (9) the average color difference at the dark points, and the like.

Naturally, all of these features need not be calculated, that is, only the feature necessary for the correction method may be calculated. Besides, image feature extraction data other than the above feature data may be used.

Next, how to generate the image feature extraction data in the digital still camera will be described. As explained above, in the digital still camera 3012, the signal transferred from the CCD 2 is converted into the R, G and B multivalued data and stored in the frame memory, and the stored data are converted into the brightness component Y and the color difference components Cr and Cb and subjected to the JPEG compression process. When the brightness component Y and the color difference components Cr and Cb are subjected to the JPEG compression process, the data have been already converted into the brightness component and the color difference components, and thus these components are well suited to extract the features such as the histogram concerning the brightness, and the average color difference amount of the pixels having the same brightness value. Moreover, in this case, since all the pixel data of the image are processed, it is effective for the digital still camera to perform the image extraction process as well as the image shot operation.

In order to obtain the histogram concerning the brightness and the average color difference amount of the pixels having the same brightness value and controllably hold the obtained data, the following procedure may be adopted.

First, the brightness Y and the color differences Cr and Cb are obtained for each pixel belonging to the image, in accordance with the following expressions.

$Y \text{(brightness)} = 0.30R + 0.59G + 0.11B$ $Cr \text{(color difference)} = R - Y$ $Cb \text{(color difference)} = B - Y$ Here, if each of the pixel data for R, G and B in the present embodiment is assumed to have ten bits (1024 gradations), the brightness Y is also converted into the depth of 1024. The histogram concerning the brightness is created by respectively calculating the frequencies of the pixels of the 1024 kinds of brightness values from 0 to 1023.

Moreover, since the calculation values of the color differences Cr and Cb are used as the data to calculate the average color difference amount of the pixels belonging to the brightness value, in the present embodiment, the data are held as follows. That is, the three members of the frequency, the Cr accumulation value and the Cb accumulation value are set in the form of structure arrangement variables from 0 to 1023, the calculated result for each pixel is reflected on each member (increment), and the obtained structure arrangement variables are held as the data.

Moreover, for example, the image feature extraction data to be generated preferably from the R, G and B data may be generated concurrently with the conversion of the R, G and B multivalued data into the brightness component Y and the color difference components Cr and Cb. That is, it is possible to perform the necessary image feature extraction process according to the image data format in the digital still camera, whereby it is unnecessary to perform the image expansion for extracting the image feature in both the digital still camera and the external system. Moreover, the format of the structure arrangement variable to be stored is not limited to the above but may be a design choice.

Next, an example of the method to store the image feature extraction data in the file will be described. When the image data is stored as the JPEG image data in the file, the image feature extraction data can be held, independently of the image data, in the same file in the form of meta data in a method according to an Exif (Exchangeable image file format for digital still camera) standard. Since the JPEG image data and the image feature extraction data are both held in the same file, any information for correlating these data with each other is unnecessary. In particular, in a case where the method according to a private tag (i.e., a data area of a non-standardized item) of the Exif standard is used, even if there are a device and an application which cannot be analyzed based on the image feature extraction data, it only has to disregard the information attached to the private tag with respect to such device and application. Thus, even in case of the device and the application which do not include analysis ability for the image feature extraction data, it is possible to access only ordinary image data, whereby a problem does not occur. Therefore, this is effective as the method of holding both the JPEG image data and the image feature extraction data in the same file.

Besides, if the image feature extraction data is defined as the data of a standardized item, it only has to record this data on a standardized tag of the Exif standard.

Figure 7:
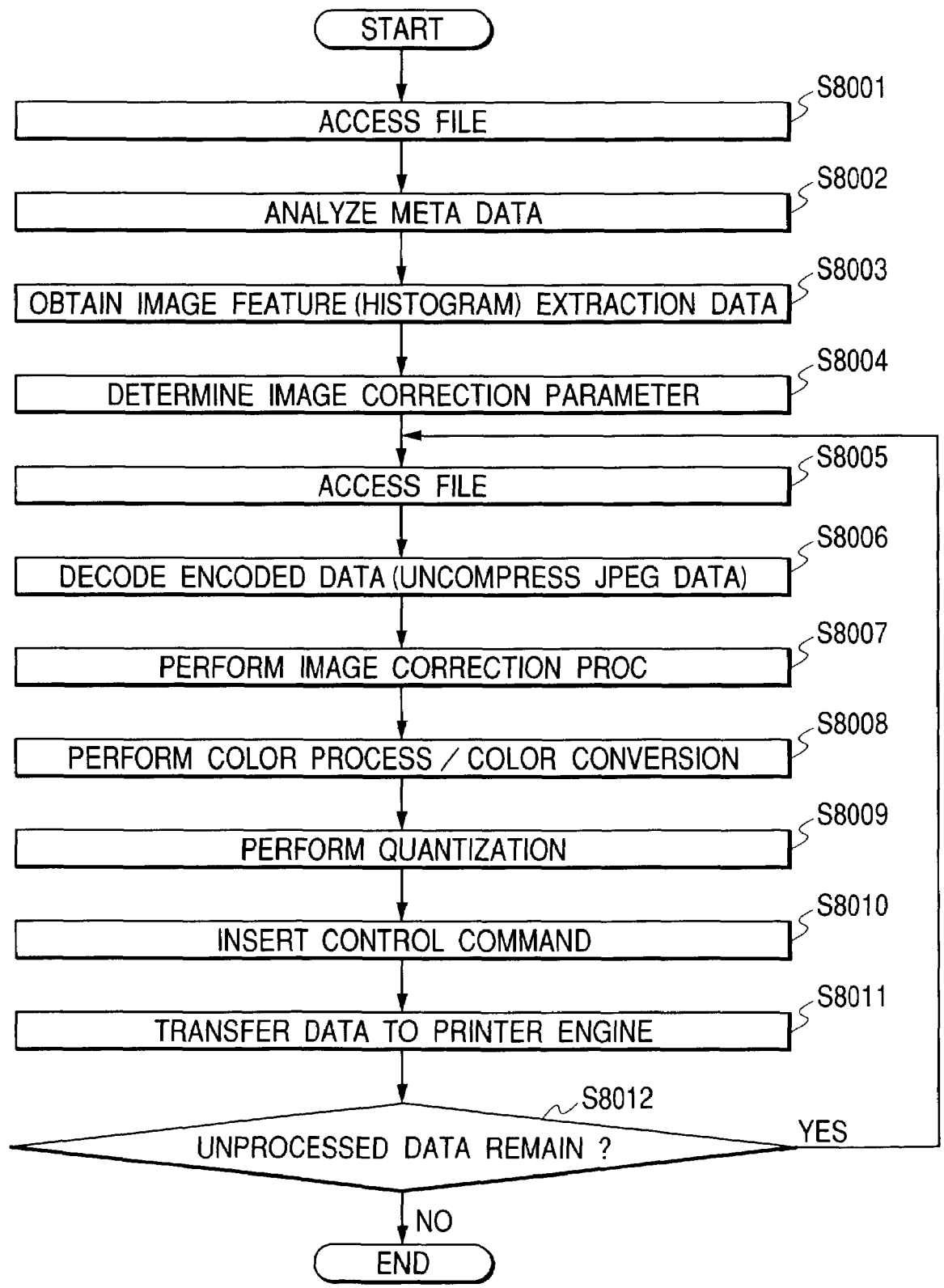
FIG. 7 is a flow chart showing a print process.

Then, the data process by the controller unit of the PD printer will be explained with reference to a flow chart shown in FIG. 7. In FIG. 7, first, the image file (JPEG image file) stored on the recording medium such as the CF card or the like inserted in the body of the PD printer is accessed in a step S8001. Here, it should be noted that the image file to be accessed is the image file of which the printing has been previously designated separately by the user through the operation panel or the like. To simplify the explanation, only a case where one image file is output will be explained in the present embodiment. However, the present invention is of course applicable to the printing of the plural image files and so-called layout printing for laying out the plural image data within one page and then printing that page.

Then, the meta data in the image file is analyzed in a step S8002, and the image feature extraction data is read based on the analysis in a step S8003. In the above explanation, the private tag of the meta data generated according to the Exif standard, and the histogram concerning the brightness of the former image and the average color difference amount of the pixels having the same brightness value are obtained. In a step S8004, various parameters for the image correction are determined in a predetermined method, on the basis of the image feature extraction data, and then, the determined parameters are stored in the memory provided inside the PD printer. As the method of determining these parameters, the above known method can be used.

The above explanation corresponds to the flow for reading the image feature extraction data. Conventionally, even if the image feature extraction process is performed on the digital still camera side, the extracted result is not written in the image file. Thus, in order to determine the image correction parameters on the printer side, it is necessary to once expand the entire image data and then perform the image feature extraction process. Here, it is apparent that the processing load (including physical access to the card reader unit) to read the entire image data from the image file and expand the read data is seriously heavy as compared with the processing load to read only the data in which the result of the image feature extraction process has been previously added to the image file as in the present embodiment. Moreover, in a case where the image data cannot be expanded at a time because the memory capacity of the body of the PD printer is limited, it is necessary to divide the entire image data into plural blocks and perform the reading, expanding and image feature extraction processes to each of the divided blocks, whereby the processing load becomes further heavy. In particular, the processing load to expand the image data such as the compressed JPEG image data is relatively heavy, whereby the influence of the processing load to the entire printer becomes heavy as the number of processes increases. Moreover, since the number of pixels available in the digital still camera increases in recent years, the difference in the printer-side processing load between the conventional method and the present embodiment becomes large, whereby the advantage of the present embodiment will become clear.

Consecutively, the image data process will be further described. That is, the file access to read the image data is performed in a step S8005. At this time, only the part of the entire image data which can be processed at a time is accessed. If the read image data has been encoded in the JPEG format or the like, the encoded image data is decoded in a step S8006. Then, in a step S8007, the image correction process is performed by using the image correction parameters determined in the step S8004. In a step S8008, the color process and the color conversion are appropriately performed, that is, the conversion of the brightness signal (R, G and B signals) into the density signal (C, M, Y and K signals), the gamma conversion and the like are performed. Then, the quantization (error diffusion) process is performed in a step S8009, a print control command is inserted into the quantized data in a step S8010, and the obtained data is transferred to the printer engine 3004 through the internal I/F 6004 in a step S8011. After then, it is judged in a step S8012 whether or not unprocessed data remains in the entire image data. If the unprocessed data remains, the flow returns to the step S8005 to read the data of the amount to be next processed from the unprocessed image data and then continue the process for the read data. On the other hand, if the unprocessed data does not remain in the step S8012, the process in the controller unit ends.

As above, according to the present embodiment, the image feature extraction data such as the histogram of the shot image and the like is filed together with the image data on the digital still camera side, and the image feature extraction data is read from the print-target image file in the memory card and used to determine the parameter for the image correction process on the PD printer side. That is, since the image feature extraction data is filed on the digital still camera side when the image data is processed and stored, the processing load on the PD printer side such as the access to the file for generating the image feature extraction data, the expansion of the image, and the like, is reduced, whereby it is possible to provide the high-quality image at high speed.

In the present embodiment, it is explained that the image data and the image feature extraction data from the digital still camera are previously stored as the image file in the storage medium, the image file is read through the storage medium by the memory card reader provided in the PD printer, and the read image file is processed. However, the present invention is not limited to this. For example, in case of so-called direct printing in which the image data of the image file stored in the recording medium of the digital still camera is read from the PD printer through the I/F such as the USB or the like and then the read image data is printed, it only has to read the image feature extraction data, determine the image correction parameter and perform the image correction process to the image data, before reading the image data. By doing so, it is possible to obtain the effect same as that in case of using the memory card reader.

Moreover, it is explained in the present embodiment that the process of generating the image feature extraction data in the digital still camera is performed before the JPEG compression is performed. However, it is possible to generate the image feature extraction data after the JPEG compression is performed. In an ordinary printer, since a JPEG-compressed image is once decompressed and then its image feature is extracted, image information lost in the image compression cannot be obtained anymore. However, in the image feature extraction process on the digital still camera side according to the present embodiment, since the process can be performed before the JPEG compression, it is possible to extract the image feature before the original image data is lost in the JPEG compression. Thus, since the image feature extraction process is performed before the JPEG compression, it is possible to prevent the problem that, since the important image data is lost during the JPEG compression, the image correction process to be later performed under normal conditions cannot be satisfactorily performed. It should be noted that such a significant effect can be achieved only by performing the image feature extraction before the shot image is filed and stored on the digital still camera side as in the present embodiment.

Second Embodiment

Hereinafter, the second embodiment of the present invention will be explained. The first embodiment explained the case where the image feature extraction data is filed together with the image data or in association with the image data. However, in the present embodiment, a digital still camera and a PD printer are directly connected to each other, and thus the image feature extraction process is performed during direct printing of that image data in the PD printer by operating an operation unit of the digital still camera.

In the case where the direct printing is performed from the digital still camera, generally, the image data to be printed is displayed on the display unit 16 of FIG. 6A. That is, a JPEG image file held in the recording medium 9 or the expansion recording medium 10 is analyzed in the signal processing unit 7, the analyzed file is expanded into the frame memory 6, and the expanded image is displayed on the display unit 16. Then, various conditions such as print designation, the number of prints and the like for the displayed image are input from the operation unit 5, and the designated image data is transferred and printed by the PD printer.

In the direct printing according to the present embodiment, the image feature extraction process is performed when the image data is displayed on the display unit 16. In case of displaying the image, the JPEG image has been expanded in the frame memory 6. Therefore, the image feature extraction process is performed in parallel with the image expansion process, and the processed result is stored in a not-shown memory, whereby the time needed to expand the JPEG image for the image feature extraction process can be skipped. If the printing is designated, the image feature extraction data previously held is transfeffed to the body of the PD printer before the image data is actually transfeffed thereto. Then, the PD printer receives the image feature extraction data, and determines image correction parameters based on the image feature extraction data. After then, the PD printer receives the image data, performs the image correction process to the received image data, and prints the processed data.

According to the present embodiment, unlike the first embodiment, the image feature extraction data is not filed together with the image data, but is generated when the image is displayed on the digital still camera, and then stored in the memory. Afterward, the stored data is directly transferred to the body of the PD printer, whereby it is possible to reduce the processing loads such as the file access, the image expansion and the like for generating the image feature extraction data on the PD printer side, and thus provide the high-quality image at high speed.

It should be noted that the image feature extraction data may be transferred on the basis of a command determined between the digital still camera and the PD printer.

Moreover, although the example that the image feature extraction process is performed when the image is displayed on the display unit 16 has been explained in the present embodiment, the image feature extraction process may be performed at other timing. For example, the image feature extraction process may be performed at the timing when the printing is instructed. In any case, it is important to perform in advance the image feature extraction process on the digital still camera side.

Other Embodiment

Hereinafter, other embodiments of the present invention will be explained. In the above second embodiment, the JPEG file is decompressed and the image feature extraction data is generated when the image in question is displayed, and the generated data is directly transfeffed to the PD printer. However, the generated image feature extraction data may be combined in the image data as tag information according to the Exif standard, or associated with the image data and then filed. Thus, even if there is an image data file to which any image feature extraction data is not added, the image feature extraction data of the newly formed image can be combined in or associated with the image data. Then, when the image file is output by the PD printer through a CF card or the like, the significant effect which is the same as that in the first embodiment can be obtained. Moreover, when the image data to which any image feature extraction data is not added is read and expanded for display on the basis of a personal computer application, an Internet terminal application or the like, the image feature extraction data can be generated and added to the image data in parallel.

Moreover, when only a JPEG thumbnail image is decompressed, the image feature extraction data of the thumbnail image may be generated and added to the image data as the image feature extraction data of the original image. At this time, information for enabling to discriminate whether the image feature extraction data is generated based on the thumbnail image or the original image is added to the image data. Thus, if the image feature extraction data is generated based on the thumbnail image, the image feature extraction process is performed at the time of the succedent original image data decompression, and the obtained image feature extraction data can be substituted for the image feature extraction data of the thumbnail image and then filed, whereby it is possible to hold more reliable image feature extraction data.

Moreover, when the printing of the image data sent from the ordinary PC is performed, if the image feature extraction data has been filed, the image correction process can be easily performed by using the filed data, whereby it is effective. In particular, since a sufficient memory and a high-speed CPU as provided in the ordinary personal computer are not available on certain terminals other than the personal computer, such as an Internet terminal being recently in widespread use, it is necessary to reduce as much as possible the processing load for the image data generation in the printer. Thus, the image correction process can be easily performed by the filing of the image feature extraction data, whereby it is effective.

Moreover, how to perform the correction using the image feature extraction data can be freely set on the recording apparatus side. Therefore, apparently unlike the conventional technique that the print control information for the specific printer is filed together with the image data, the technique according to the present invention can be more widely used. Moreover, the technique according to the present invention can be effectively used not only in the printing by the printer but also in image display by the display device.

Moreover, the generation of the image feature extraction data depends on only the image data but is not influenced by a generation location of this data. Like the algorithm for creating the above histogram concerning the brightness or the algorithm for generating the above data representing the average color difference amount of the pixels having the same brightness value, if an algorithm of the image feature extraction process which is quite irrelevant to the shooting mode of the digital still camera and the kind of printer is used, the same result can be obtained even if the image feature extraction data is generated in the digital still camera or on the host PC. It is apparent in this respect that the wide usability in the present invention is higher than that in the conventional technique.

Moreover, the above functions may be executed by the host computer according to a program externally installed. In this case, the present invention is applicable to even a case where an information group including the program is supplied to the output device by the storage medium such as a CD-ROM, a flash memory or the like or from an external storage medium through a network.

Moreover, it is needless to say that the object of the present invention can be achieved in a case where the storage medium storing the program codes of software to realize the functions of the above embodiments is supplied to a system or an apparatus and then a computer (or CPU or MPU) in the system or the apparatus reads and executes the program codes stored in the storage medium.

In this case, the program codes themselves read from the storage medium realize the new functions of the present invention, whereby the storage medium storing these program codes constitutes the present invention.

As the storage medium for supplying the program codes, for example, a floppy disk, a hard disk, an optical disk, a magnetooptical disk, a CD-ROM, a CD-R, a DVD-ROM, a magnetic tape, a nonvolatile memory card, a ROM, an EEPROM, a silicon disk or the like can be used.

Moreover, it is needless to say that the present invention includes not only a case where the functions of the above embodiments are realized by executing the program codes read by the computer, but also a case where an OS (operating system) or the like functioning on the computer executes a part or all of the actual process according to instructions of the program codes, whereby the functions of the above embodiments are achieved by that process.

What is claimed is:

1. A digital camera comprising:
an image pickup unit adapted to acquire an RGB image signal by converting picked-up light into an electronic signal;
a processing unit adapted to convert the acquired RGB image signal into an image signal of a brightness color difference component and execute a JPEG (Joint Photographic Experts Group) compression process on the convened image signal;
an extraction unit adapted to extract, before an image file acquired in an image pickup process is recorded on a recording medium, first feature data acquired by analyzing the RGB image signal acquired by said image pickup unit and second feature data acquired by analyzing the image signal of the brightness color difference component precedent to the JPEG compression process acquired by said processing unit;
a file generation unit adapted to generate, by using the first feature data and the second feature data extracted by said extraction unit as additional information capable of being used in the correction process of the image signal, the image file together with the image signal subjected to the JPEG compression process by said processing unit; and
a recording unit adapted to record the image file on the recording medium,
wherein said file generation unit generates the image file, by recording from among the first feature data and the second feature data, the data of a standardized item according to an Exif (Exchangeable image file format) standard as a standard tag according to the Exif standard, and recording data other than the data of the standardized item according to the Exif standard as a private tag according to the Exif standard.

2. A digital camera according to claim 1,
wherein at least one of the first and second feature data extracted from the image signal is at least one of a histogram concerning brightness, an average color difference amount of each pixel having a same brightness value, a histogram concerning hue, a histogram concerning color saturation, a histogram concerning density, highlight-point brightness, dark-point brightness, an average color difference at highlight points, and an average color difference at dark points.

3. A digital camera according to claim 1, wherein said extraction unit extracts the second feature data from the image signal by obtaining the brightness Y and the color differences Cr and Cb for each pixel belonging to an image corresponding to the processed image signal,
wherein said extraction unit extracts the second feature data used to correct the image signal from the image signal by:
a) obtaining the brightness Y and the color differences Cr and Cb for each pixel belonging to an image corresponding to the processed image signal image signal according to the expressions:

$Y \text{(brightness)} = 0.30R + 0.59G + 0.11B$ $Cr \text{(color difference)} = R - Y$ $Cb \text{(color difference)} = B - Y$, and b) calculating the frequencies of the pixels of different brightness values Y.

4. A control method for a digital camera, comprising:
an image pickup step of acquiring an RGB image signal by converting picked-up light into an electronic signal;
a processing step of convening the acquired RGB image signal into an image signal of a brightness color difference component and executing a JPEG (Joint Photographic Experts Group) compression process on the convened image signal;
an extraction step of extracting, before an image file acquired in the image pickup step is recorded on a recording medium, first feature data acquired by analyzing the RGB image signal acquired by said image pickup step and second feature data acquired by analyzing the image signal of the brightness color difference component, precedent to the JPEG compression process acquired by said processing step;
a file generation step of generating, by using the first feature data and the second feature data extracted in said extraction step as additional information capable of being used in the correction process of the image signal, the image file together with the image signal subjected to the JPEG compression process in said processing step; and
a recording step of recording the image file on the recording medium,
wherein said file generation step generates the image file, by recording, from among the first feature data and the second feature data, the data of a standardized item according to an Exif (Exchangeable image file format) standard as a standard tag according to the Exif standard, and recording data other than the data of the standardized item according to the Exif standard as a private tag according to the Exif standard.

5. A control method according to claim 4,
wherein at least one of the first and second feature data extracted from the image signal is at least one of a histogram concerning brightness, an average color difference amount of each pixel having a same brightness value, a histogram concerning hue, a histogram concerning color saturation, a histogram concerning density, highlight-point brightness, dark-point brightness, an average color difference at highlight points, and an average color difference at dark points.

6. A control method according to claim 4, wherein said extraction step extracts the second feature data from the image signal by obtaining the brightness Y and the color differences Cr and Cb for each pixel belonging to an image corresponding to the processed image signal,
wherein said extraction step extracts the second feature data used to correct the image signal from the image signal by:
a) obtaining the brightness Y and the color differences Cr and Cb for each pixel belonging to an image corresponding to the processed image signal image signal according to the expressions:

$Y \text{(brightness)} = 0.30R + 0.59G + 0.11B$ $Cr \text{(color difference)} = R - Y$ $Cb \text{(color difference)} = B - Y$, and b) calculating the frequencies of the pixels of different brightness values Y.

7. An image processing method comprising:
a reading step of reading feature extraction data, from a digital camera which comprises image pickup means for acquiring an RGB image signal by converting picked-up light into an electronic signal, processing means for convening the acquired RGB image signal into an image signal of a brightness color difference component and executing a JPEG (Joint Photographic Experts Group) compression process on the convened image signal, extraction means for extracting, before an image file acquired in an image pickup process is recorded on a recording medium, first feature data acquired by analyzing the RGB image signal acquired by said image pickup means and second feature data acquired by analyzing the image signal of the brightness color difference component, precedent to the JPEG compression process acquired by said processing means, file generation means for generating, by using the first feature data and the second feature data extracted by the extraction means as additional information capable of being used in the correction process of the image signal, the image file together with the image signal subjected to the JPEG compression process by the processing means, and recording means for recording the image file on the recording medium;

an input step of inputting the image file from the digital camera after reading the first and second feature data; and a correction step of correcting an image of the image file based on the first and second feature data using the correction process, wherein the file generation means generates the image file, by recording from among the first feature data and the second feature data, the data of a standardized item according to an Exif (Exchangeable image file format) standard as a standard tag according to the Exif standard, and recording data other than the data of the standardized item according to the Exif standard as a private tag according to the Exif standard.

8. An image processing method according to claim 7, wherein said extraction means extracts the second feature data from the image signal by obtaining the brightness Y and the color differences Cr and Cb for each pixel belonging to an image corresponding to the processed image signal, wherein said extraction means extracts the second feature data used to correct the image signal from the image signal by:

a) obtaining the brightness Y and the color differences Cr and Cb for each pixel belonging to an image corresponding to the processed image signal image signal according to the expressions:

$Y \text{ (brightness)} = 0.30R + 0.59G + 0.11B$ $Cr \text{ (color difference)} = R - Y$ $Cb \text{ (color difference)} = B - Y,$ and b) calculating the frequencies of the pixels of different brightness values Y.

9. An image processing system comprising:
a digital camera comprising
an image pickup unit adapted to acquire an RGB image signal by converting picked-up light into an electronic signal,
a processing unit adapted to convert the acquired RGB image signal into an image signal of a brightness color difference component and execute a JPEG (Joint Photographic Experts Group) compression process on the converted image signal,
an extraction unit adapted to extract, before an image file acquired in an image pickup process is recorded on a recording medium, first feature data acquired by analyzing the RGB image signal acquired by said image pickup unit and second feature data acquired by analyzing the image signal of the brightness color difference component precedent to the JPEG compression process acquired by said processing unit;
a file generation unit adapted to generate, by using the first feature data and the second feature data extracted by the extraction unit as additional information capable of being used in the correction process of the image signal, the image file together with the image signal subjected to the JPEG compression process by the processing unit, and
a recording unit adapted to record the image file on the recording medium, wherein said file generation unit generates the image file, by recording from among the first feature data and the second feature data, the data of a standardized item according to an Exif (Exchangeable image file format) standard as a standard tag according to the Exif standard, and recording the data other than the data of the standardized item according to the Exif standard as a private tag according to the Exif standard;
a reading unit adapted to read the first and second feature data from said digital camera; and
a printer comprising
an input unit adapted to input the image file from said digital camera after reading the first and second feature data, and
a correction unit adapted to correct an image of the image file based on the first and second feature data included in the additional information using the correction process.

10. An image processing system according to claim 9, further comprising a transfer unit adapted to transfer the first and second feature data while associating the first and second feature data with a picked-up image.

11. An image processing system according to claim 9, wherein at least one of the first and second feature data extracted from the image signal is at least one of a histogram concerning brightness, an average color difference amount of each pixel having a same brightness value, a histogram concerning hue, a histogram concerning color saturation, a histogram concerning density, highlight-point brightness, dark-point brightness, an average color difference at highlight points, and an average color difference at dark points.

12. An image processing system according to claim 9, wherein said extraction unit extracts the second feature data from the image signal by obtaining the brightness Y and the color differences Cr and Cb for each pixel belonging to an image corresponding to the processed image signal, wherein said extraction unit extracts the second feature data used to correct the image signal from the image signal by:

a) obtaining the brightness Y and the color differences Cr and Cb for each pixel belonging to an image corresponding to the processed image signal image signal according to the expressions:

$Y \text{ (brightness)} = 0.30R + 0.59G + 0.11B$ $Cr \text{ (color difference)} = R - Y$ $Cb \text{ (color difference)} = B - Y,$ and b) calculating the frequencies of the pixels of different brightness values Y.

* * * * *